Patented Nov. 7, 1950

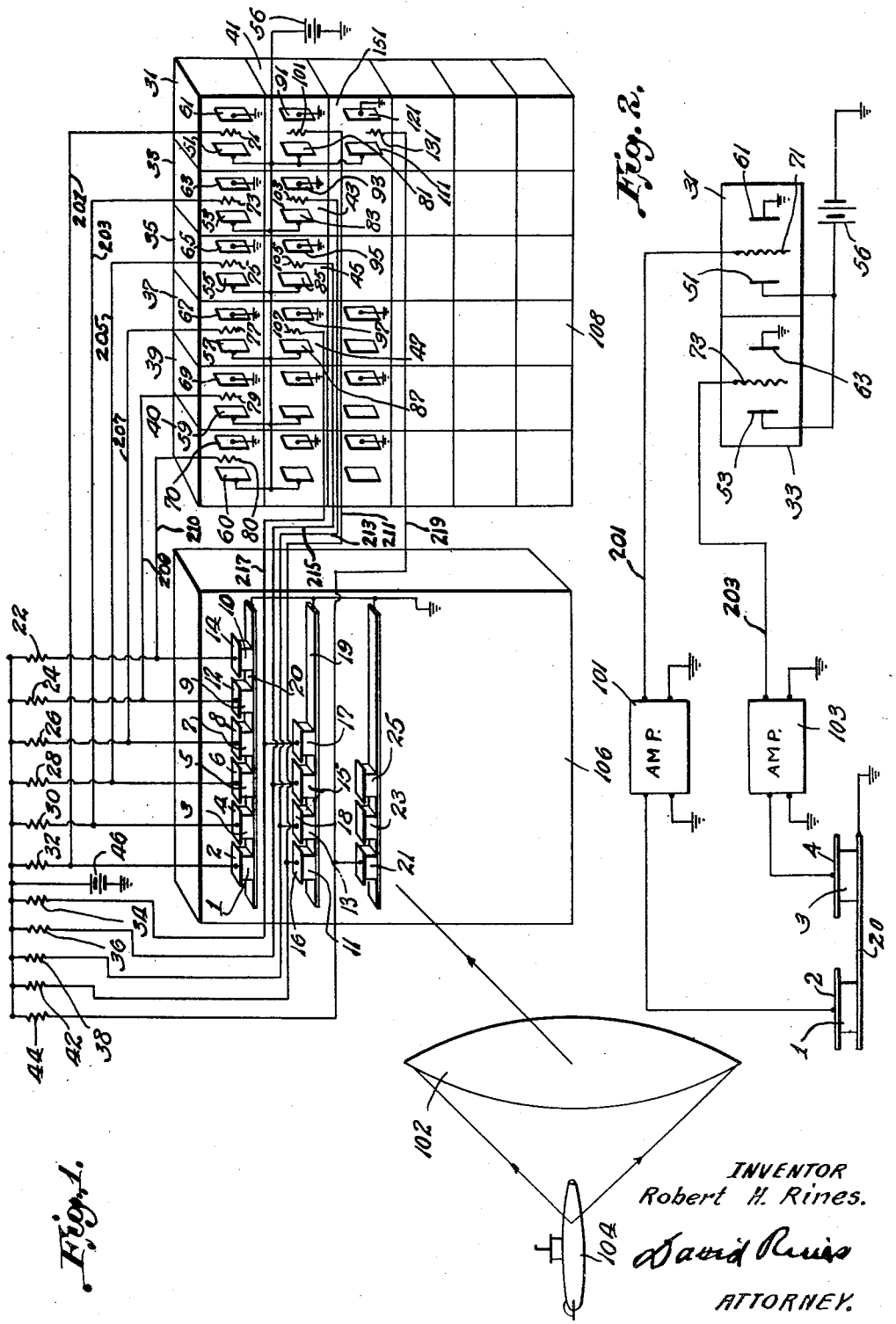

2,528,729

UNITED STATES PATENT OFFICE 2,528,729

OBJECT DETECTING SYSTEM PRODUCING A VISIBLE LIKENESS OF THE OBJECT

Robert Harvey Rines, Brookline, Mass.

Application August 3, 1945, Serial No. 608,783

23 Claims. (Cl. 177—352)

The present invention relates to electric systems, and more particularly to receiving systems using sound waves as the agency of communication. The term "sound" will be employed hereinafter, in the specification and the claim, to include not only the audible part of the sound spectrum, but also, and more particularly, the ultrasonic spectrum, and to include also all kinds of elastic vibrations.

An object of the invention is to provide a new and improved sound-receiving system.

Another object is to provide a novel combined sound-and-television system.

Another object of the present invention is to provide a new sound-locator system for both detecting the presence of a body and producing a visible likeness thereof.

Other and further objects will be explained hereinafter and will be more particularly pointed out in the appended claims.

The invention will now be more fully explained in connection with the accompanying drawings, in which Fig. 1 is a diagrammatic view of circuits and apparatus arranged and constructed in accordance with a preferred embodiment thereof, and Fig. 2 is a fragmentary view illustrating a modification.

A directive ultrasonic transmitter (not shown) may be employed to transmit ultrasonic waves toward an object 104, illustrated as an underwater submarine. The sound waves are reflected and scattered from the surface of the object 104 toward a sound-receiving station. The invention is operable also with objects 104 that emit, as well as reflect or scatter, sound waves.

At the receiving station, the sound waves thus reflected and scattered from the object 104 may be focused, converged or directed by a sound lens 102 upon a medium that is mechanically vibratory in response to sound waves impinging thereon. This medium is illustrated in the form of a bank or array 106, comprising a plurality of sound-receiving pick-up unit elements, each vibratory in response to the sound energy impinging thereon. The sound lens 102 may be replaced by any other type of well-known lens, mirror or other directive system for focusing the sound waves scattered and reflected from the object 104 on the mechanically vibratory medium comprising the bank or array 106 of pick-up elements. The sound lens may, for example, be constituted of a collodion balloon filled with carbon dioxide or sulphur dioxide; or any other substance for refracting the sound waves.

The vibratory pick-up elements of the bank or array 106, for purposes of illustration, are shown as piezo-electric-crystal receiver elements. They may, for example, be constituted of Rochelle salt, dihydrogen potassium phosphate, or any other suitable substance, including quartz. The front surface of each crystal element projects forward, in the direction of the incoming sound waves.

The crystal pick-up units are shown arranged in the form of rows and columns, in the proximity of the focal plane of the lens 102. The first or uppermost row of the bank is illustrated as comprising the crystals 1, 3, 5, 7, 9 and 10, shown as equally spaced horizontally. The second row from the top is shown constituted of similarly disposed crystals, respectively disposed directly below the corresponding crystals of the first row; several of these are illustrated at 11, 13, 15 and 17. The third of next-lower row is similarly constituted, several of the crystals being illustrated at 21, 23 and 25. Though only a small number of pick-up units is shown in each row, and though only three rows are shown, this is merely for illustrative purposes, in order not to confuse the disclosure. It will be understood that, in practice, a large number of pick-up units will be employed in each row.

The crystal elements 1, 11, 21, etc., are shown arranged vertically in the first or left-hand column. The crystal elements 3, 13, 23, etc., are disposed in the second column from the left. The crystal elements 5, 15, 25, etc., are disposed in the third column from the left, the crystal elements 7, 17, etc., in the fourth column from the left, and so on. There may, or may not, be as many columns as there are pick-up units in each row. Though each column is shown as comprising only a few pick-up units, this is again in order not to complicate the drawing.

The pick-up units will, of course, all receive the reflected or scattered sound waves through the lens 102 simultaneously. There will be focused or directed on the front surface of each pick-up unit a sound-wave intensity corresponding to the intensity of the sound energy reflected or scattered from a corresponding component part or area of the object 104. Each pick-up unit will vibrate individually and separately in response to the sound waves impinged upon it. Voltages will thus be produced across the pick-up elements, converted by the elements from the different field strengths of sound-wave energy thus received by them, and proportional to the intensity of the sound-wave energy reflected or scattered or otherwise emanating from the various component parts of the object 104 and converged upon the array 106 of pick-up elements by the lens 102. The sound lens 102 or its equivalent will thus focus upon the array 106 the sound waves reflected or scattered from the various component parts of the object 104 in various energy strengths dependent on the reflecting properties of the component parts of the object 104, thus to produce a faithful sound image of this distribution of the sound waves in approximately the focal plane of the lens 102. It has heretofore been proposed to convert a sound-energy picture of this character into a visible-picture likeness of the object 104 both with the aid of scanning equipment and also with complex stationary equipment. With the aid of the present invention, improved results are obtained without scanning equipment or complex stationary equipment, but, on the contrary, with highly sensitive, relatively inexpensive and simple apparatus. According to the preferred embodiment of the invention, the visible picture is caused to appear upon a bank of neon gas or similar illuminating tubes, as hereinafter more fully described. Still a further feature of the invention resides in the direct application of the alternating high-frequency voltages developed by the sound-wave receiving elements in response to the impinging sound energy to the gas-discharge illuminating means, with or without amplification.

The crystals of the bank or array 16 are provided with crystal electrodes. The crystals of the uppermost row are provided with a common lower grounded electrode 20, the crystals of the next lower row with a common lower grounded electrode 19, and so on. The crystals 1, 3, 5, 7, 9 and 10 are provided with further top electrodes 2, 4, 6, 8, 12 and 14, respectively; the crystals 11, 13, etc., with top electrodes 16, 18, etc.; and so on.

The electrodes 2, 4, 6, 8, 12 and 14 are respectively connected through isolating impedances 32, 30, 28, 26, 24 and 22 through a sensitizing battery 46 to ground. The opposite crystal electrode faces of these crystals are, therefore, subjected to the vibration-sensitizing or enhancing potential of the battery 46. The electrodes 16, 18, etc., of the second row of crystals are similarly connected to the battery 46 through isolating impedances 42, 38, 36, 34, etc. The other electrodes of the crystals 21, 23, 25, etc., of the third row are similarly connected to the battery 46 through isolating impedances, one of which is shown at 44.

The visible image or likeness, before-mentioned, is produced, preferably, with the aid of gas-discharge means, such as a series of neon-cell elements, arranged in a bank 108, one corresponding to each of the crystals. Thus, there is a topmost row of cells 31, 33, 35, 37, 39 and 40, corresponding to the respective crystals 1, 3, 5, 7, 9 and 10. There is a second, or next lower, row of neon cells 41, 43, 45, 47, etc., corresponding to the respective crystals 11, 13, 15, 17, etc. There is a third lower row of cells 151, etc., corresponding to the respective crystals 21, 23, 25, etc. The cells of the respective rows are arranged in columns corresponding to the columns of the crystals.

The right-hand column of cells 31, 41, 151, etc., for example, corresponds to the left-hand column of crystals 1, 11, 21, etc.; the second column from the right of neon cells 33, 43, etc., corresponds to the second column of crystals from the left 3, 13, 23, etc.; the third column of neon cells from the right 35, 45, etc., corresponds to the third column of crystals from the left 5, 15, 25, etc.; the fourth column of neon cells from the right 37, 47, etc., corresponds to the fourth column of crystals from the left 7, 17, etc.

Each cell or element is provided with a cathode, an anode, and a control electrode for controlling the intensity of the glow discharge, as hereinafter more fully described. The control electrode may preferably be positioned between the anode and the cathode. The cathodes of the uppermost row of cells are indicated at 61, 63, 65, 67, 69 and 70, and are shown grounded. The anodes of the respective cells are indicated at 51, 53, 55, 57, 59 and 60. The control electrodes of these cells are respectively shown at 71, 73, 75, 77, 79 and 80. The grounded cathodes of the second row of cells 41, 43, 45, 47, etc., are shown at 91, 93, 95, 97, etc.; the anodes at 81, 83, 85, 87, etc.; and the control electrodes at 101, 103, 105, 107, etc. The grounded cathode of the cell 151 of the third row of cells is shown at 121, the anode at 111, and the control electrode at 131.

All the anodes are connected through a common battery 56 through ground to the corresponding cathodes, in order to provide a plate circuit through each cell from cathode to anode. Cross connections from the anode of any particular cell to the cathode of any other particular cell are prevented by insulation such as the walls of the cells. Current may flow through each cell, therefore, to produce continuous glows of equal intensity in the cells.

The intensity of the illumination or glow may be modified by varying the potential upon the control electrode of the corresponding cell in accordance with the high-frequency voltage produced by the pressure of the sound waves upon the corresponding piezo-electric crystal and directly applied to the cell without ratification.

To this end, the control electrode 71 is connected by a conductor 201 to the electrode 2 of the crystal 1; the control electrode 73 by a conductor 203 to the electrode 4 of the crystal 3; the control electrode 75 by a conductor 205 to the electrode 6 of the crystal 5; the control electrode 77 by a conductor 207 to the electrode 8 of the crystal 7; the control electrode 79 by a conductor 209 to the electrode 12 of the crystal 9; and the control electrode 80 by a conductor 210 to the electrode 14 of the crystal 10.

The same applies to the control electrodes of the cells of the second row. The control electrode 101 is connected by a conductor 211 to the electrode 16 of the crystal 13; the control electrode 103 by a conductor 213 to the electrode 18 of the crystal 13; the control electrodes 105 and 107 by conductors 215 and 217, respectively, to the top electrodes of the crystals 15, 17, etc. The control electrode 131 of the cell 151 of the third row is similarly shown connected by a conductor 219 to the top electrode of the crystal 21 of the third row.

If desired, the alternating voltages of the crystals may be enhanced through amplification before they are transmitted to the control electrodes of the respective cells. In Fig. 2, an amplifier 101 is shown connected between the cell 31 and the crystal 1 by the conductor 201 and ground. The top and bottom electrodes 2 and 20 of the crystal 1 are connected to the left-hand or input terminals of the amplifier 101, the output or right-hand terminals of which are connected between the control electrode 71 and the cathode 61 of the cell 31. An amplifier 103 is similarly shown connected between the cell 33 and the crystal 3 by a conductor 203 and ground. Further amplifiers, not shown, may similarly be employed with the remaining crystal elements and gas-discharge cells. The output of the amplifiers will vary at successive instants in accordance with the potentials upon the crystals to which they are directly connected, produced by the pressures of the sound waves. The same result will be produced to a less degree without the amplifiers.

Successive high-frequency energy voltages are thus produced upon the control electrodes of the respective neon cells of magnitude proportional to the sound-wave energy received by the corresponding pick-up elements. The illumination resulting from the intensity modulation of the neon gas in the respective cells will be such that the intensity of illumination of the respective cells in the region of the control electrodes between the respective anodes and cathodes will correspond to the sound-wave image on the corresponding crystals of the rows and columns of the bank 106; this sound-wave image, in turn, corresponding to correspondingly disposed parts of the object 104.

To each row of crystals, therefore, there corresponds a row of neon or other cells; and, to the sound distribution on each row of crystals, there corresponds a horizontal row of neon-illuminating cells that is graded in intensity. This intensity, as before stated, is distributed in conformity with the corresponding state of voltage across the electrodes of the corresponding crystals of the array 106.

The sound waves received by the crystal units along the successive rows and columns will thus become converted into corresponding portions of the visual likeness, along correspondingly disposed rows and columns of the respective neon cells. The visual picture of the object 104 on the cell bank 108 will accordingly correspond to the sound-energy picture on the array 106 of pick-up elements which, in turn, corresponds to the actual object 104. A visual image of the object 104 is thus produced on the bank 108.

The crystals of the bank 106 may be wafer-thin, in order to make possible the use of a sufficiently large number of them in the array 106 to provide for good definition. The frequency of the sound waves, for example, may be 100 megacycles, corresponding to a wave-length of approximately $5 \times 10^{-5}$ feet, in water.

Although the invention has been described in connection with pick-up elements arranged in rows and columns, it will be understood that this is not essential, for other arrangements are also possible. Pick-up elements arranged along concentric circles covering the field, or along a continuous spiral, will also serve, though the neon-cell arrangement would, of course, be correspondingly modified.

A single gas-discharge cell could be used in place of a row of individual cells. In the first row, for example, electrodes 60 and 61 could strike a glow in a single cell in which control electrodes 80, 79, 77, 75, 73, and 71 are disposed. Such a system would not, however, provide quite so good definition.

Further modifications will occur to persons skilled in the art, and all such are considered to fall within the spirit and scope of the invention, as defined in the appended claims.

What is claimed is:

1. An electric system having, in combination, a bank of piezo-electric means, a bank of gas-discharge means connected with the piezo-electric means, means for focusing a sound-wave image of an object upon the piezo-electric means to produce mechanical vibrations of the piezo-electric means, and means connected to the gas-discharge means controlled in accordance with the intensity of the mechanical vibrations of the piezo-electric means and directly responsive to the alternating voltages produced thereby for controlling the intensity of the discharge of the gas-discharge means to produce a likeness of the object.

2. An electric system having, in combination, a medium that is mechanically vibratory in response to sound waves, gas-discharge means having anode means and cathode means between which a discharge may pass, control-electrode means, means for directing sound waves upon the medium to produce mechanical vibrations of the medium, and means controlled in accordance with the intensity of the mechanical vibrations of the medium for controlling the control-electrode means to control the intensity of the discharge between the anode means and the cathode means.

3. An electric system having, in combination, a plurality of sound-receiving elements mechanically vibratory in response to sound waves, a plurality of gas-discharge means corresponding to the elements and having anode means and cathode means between which a discharge may pass, control-electrode means, means for focusing a sound-wave image of an object upon the elements to produce mechanical vibrations thereof, and means connected to the gas-discharge means controlled in accordance with the intensity of the mechanical vibrations of the elements for controlling the control-electrode means to control the intensity of the discharge between the anode means and the cathode means to produce a likeness of the object.

4. An electric system having, in combination, a bank of piezo-electric means, a bank of gas-discharge means connected with the piezo-electric means, each discharge means having anode means and cathode means between which a discharge may pass and control-electrode means, means for focusing a sound-wave image of an object upon the piezo-electric means to produce mechanical vibrations of the piezo-electric means, and means controlled in accordance with the intensity of the mechanical vibrations of the respective piezo-electric means and directly responsive to the alternating voltages produced thereby for controlling the respective control electrode means to control the intensity of the discharges between the respective anode means and cathode means to produce a likeness of the object.

5. An electric system having, in combination, a bank of piezo-electric elements, a bank of gas-discharge elements connected with the respective piezo-electric elements, each gas-discharge element having an anode and a cathode between which a discharge may pass and a control electrode, means for directing sound waves upon the piezo-electric elements to produce vibrations of the piezo-electric elements, and means controlled in accordance with the intensity of the vibrations of the respective piezo-electric elements and directly responsive to the alternating voltages produced thereby for controlling the respective control electrodes to control the intensity of the discharges between the respective anodes and cathodes.

6. An electric system having, in combination, a plurality of sound-receiving elements mechanically vibratory in response to sound waves, a plurality of gas-discharge means connected with the respective elements, means for focusing a sound-wave image of an object upon the elements to produce mechanical vibrations thereof, means for enhancing the vibrations of the elements, and means connected to the gas-discharge means controlled in accordance with the intensity of the enhanced mechanical vibrations of the elements for controlling the intensity of the discharge of the gas-discharged means to produce a likeness of the object.

7. An electric system having, in combination, a plurality of sound-receiving elements mechanically vibratory in response to sound waves, a plurality of gas-discharge means connected with the respective elements, means for focusing a sound-wave image of and object upon the elements to produce mechanical vibrations thereof, means connected to the gas-discharge means responsive to the mechanical vibrations of the elements and controlled in accordance with the intensity of the said waves for impressing a voltage upon the elements in order to enhance the mechanical vibrations of the elements, and means controlled in accordance with the enhanced mechanical vibrations of the elements for controlling the intensity of the discharge of the gas-discharge means to produce a likeness of the object.

8. An electric system having, in combination, a plurality of means for receiving sound waves, means for converging a sound-wave image of an object upon the sound-wave-receiving means, a plurality of gas-discharge means connected to the respective sound-receiving means, means for causing a glow-discharge in the gas-discharge means, and means connected to the gas-discharge means controlled in accordance with the sound waves received by each of the sound-wave-receiving means for modifying the intensity of the glow-discharge in the corresponding gas-discharge means to produce upon the plurality of gas-discharge means a likeness of the object.

9. An electric system having, in combination, a plurality of means for converting sound-wave energy into alternating electric energy, means for converging a sound-wave image of an object upon the converting means, a plurality of gas-discharge means corresponding to the plurality of converting means and means connected to the gas-discharge means responsive to the alternating electric energy converted from the sound-wave energy by each of the converting means for controlling the intensity of discharge of the corresponding gas-discharge means to produce upon the plurality of gas-discharging means a likeness of the object.

10. An electric system having, in combination, a plurality of sound-receiving elements for receiving sound waves and converting the received waves into alternating voltages, means for converging a sound-wave image of an object upon the sound-receiving elements, a gaseous-discharge cell connected with each element, and means directly responsive to the alternating voltages converted from the sound waves received by each element for controlling the intensity of discharge of the corresponding cell to produce a likeness of a portion of the object corresponding to that from which sound waves were received by the corresponding element.

11. An electric system having, in combination, a plurality of sound-receiving elements for receiving sound waves and converting the received waves into alternating voltages, means for converging a sound-wave image of an object upon the sound-receiving elements, an illuminating element connected to each sound-receiving element, and means controlled by the sound waves received by the sound-receiving elements and directly responsive to the alternating voltages converted therefrom for controlling the intensity of illumination of the illuminating elements to produce a likeness of the object.

12. An electric system having, in combination, a plurality of sound-receiving elements for receiving sound waves and converting the received waves into alternating voltages, means for converging a sound-wave image of an object upon the sound-receiving elements, an illuminating element connected to each sound-receiving element, and means controlled by the sound-receiving elements and directly responsive to the alternating votlages converted therefrom for simultaneously controlling the intensity of illumination of the illuminating elements to produce at one and the same time a likeness of the object.

13. An electric system having, in combination, a plurality of sound-receiving elements that are mechanically vibratory in response to sound waves, a plurality of gas-discharge means corresponding to the sound-receiving elements, means for focusing a sound-wave image of an object upon the elements to produce mechanical vibrations thereof, and means connected to the gas-discharge means controlled in accordance with the intensity of the mechanical vibrations of the elements for controlling the intensity of the discharge of the gas-discharge means to produce a likeness of the object upon the gas-discharge means.

14. An electric system having, in combination, a plurality of sound-receiving elements that are mechanically vibratory in response to sound waves, a plurality of gas-discharge means separate from the elements, means for focusing sound waves from an object upon the elements to produce mechanical vibrations thereof, and means connected to the gas-discharge means controlled in accordance with the intensity of the mechanical vibrations of the elements for controlling the intensity of the discharge of the gas-discharge means to produce a likeness of the object upon the gas-discharge means.

15. An electric system having, in combination, a medium that is mechanically vibratory in response to sound waves, gas-discharge means, means for causing a glow-discharge in the gas-discharge means, means for focusing a sound-wave image of an object upon the medium to produce mechanical vibrations of the medium, and means connected to the gas-discharge means controlled in accordance with the mechanical vibrations of the medium for modifying the intensity of the glow-discharge in the gas-discharge means to produce a likeness of the object upon the gas-discharge means.

16. An electric system having, in combination, a medium that is mechanically vibratory in response to sound waves, gas-discharge means having anode means and cathode means between which a discharge may pass, means for producing a glow discharge between the anode means and the cathode means, control-electrode means, means for directing sound waves upon the medium to produce mechanical vibrations of the medium, and means controlled in accordance with the intensity of the mechanical vibrations of the medium for controlling the control-electrode means to modify the intensity of the glow discharge between the anode means and the cathode means.

17. An electric system having, in combination, a medium that is mechanically vibratory in response to sound waves, gas discharge means having anode means and cathode means, means for permanently connecting the medium and the gas-discharge means, means for directing sound waves upon the medium to produce mechanical vibrations of the medium, and means cooperating with the connecting means and controlled in accordance with the intensity of the mechanical vibrations of the medium for continuously controlling the intensity of the gas discharge between the anode means and the cathode means.

18. An electric system having, in combination, a bank of piezo-electric means, a bank of gas-discharge means permanently connected with the piezo-electric means, each discharge means having anode means and cathode means between which a discharge may pass and control-electrode means, means for focusing a sound wave image of an object upon the piezo-electric means to produce mechanical vibrations of the piezo-electric means, and means controlled in accordance with the intensity of the mechanical vibrations of the respective piezo-electric means for continuously controlling the respective control electrodes to control the intensity of the discharges between the respective anode means and cathode means to produce a likeness of the object.

19. An electric system having, in combination, a bank of piezo-electric elements, a bank of gas-discharge elements permanently connected with the respective piezo-electric elements, each gas-discharge element having an anode and a cathode between which a discharge may pass and a control electrode, means for directing sound waves upon the piezo-electric elements to produce vibrations of the piezo-electric elements, and means controlled in accordance with the intensity of the vibrations of the respective piezo-electric elements for continuously controlling the respective control electrodes to control the intensity of the discharges between the respective anodes and cathodes.

20. An electric system having, in combination, a bank of piezo-electric elements, a bank of gas-discharge elements connected with the respective piezo-electric elements, each gas-discharge element having an anode and a cathode between which a discharge may pass and a control electrode, means for producing a glow discharge in each gas-discharge element between its anode and cathode, means for directing sound waves upon the piezo-electric elements to produce vibrations of the respective piezo-electric elements, and means controlled in accordance with the vibrations of the respective piezo-electric elements for controlling the respective control electrodes to control intensity of the glow discharges between the respective anodes and cathodes.

21. An electric system having, in combination, a plurality of sound-receiving elements for receiving sound waves, means for converging a sound-wave image of an object upon the sound-receiving elements, a gaseous-discharge cell connected with each element, means for producing a discharge in each gaseous-discharge cell, and means responsive to the sound waves received by each element for controlling the intensity of discharge of the corresponding cell to produce a likeness of a portion of the object corresponding to that from which sound waves were received by the corresponding element.

22. An electric system having, in combination, a plurality of sound-receiving elements for receiving sound waves, means for converging a sound-wave image of an object upon the sound-receiving elements, an illuminating element connected to each sound-receiving element, means for illuminating each illuminating element, and means controlled by the sound waves received by the sound-receiving elements for controlling the intensity of illumination of the illuminating elements to produce a likeness of the object.

23. An electric system having, in combination, a plurality of sound-receiving elements for receiving sound waves, means for converging a sound-wave image of an object upon the sound-receiving elements, an illuminating element connected to each sound-receiving element, means for illuminating each illuminating element, and means controlled by the sound waves received by the sound-receiving elements for simultaneously controlling the intensity of illumination of the illuminating elements to produce at one and the same time a likeness of the object.

ROBERT HARVEY RINES.

REFERENCES CITED

The following references are of record in the file of this patent:

UNITED STATES PATENTS

| Number | Name | Date |
| --- | --- | --- |
| Re. 17,712 | Schmierer | June 24, 1930 |
| 2,031,884 | Gray | Feb. 25, 1936 |
| 2,056,301 | Schroter | Oct. 6, 1936 |
| 2,069,851 | Rosenberg | Feb. 9, 1937 |
| 2,120,971 | Bailey | June 21, 1938 |
| 2,155,471 | Cawley | Apr. 25, 1939 |
| 2,212,845 | Nicolson | Aug. 27, 1940 |
| 2,216,949 | Kellogg | Oct. 8, 1940 |
| 2,306,272 | Levy | Dec. 22, 1942 |
| 2,453,502 | Dimmick | Nov. 9, 1948 |